Feb. 9, 1943.   J. H. CARPENTER ET AL   2,310,837
PETROLEUM DISTILLATION
Filed Sept. 18, 1941
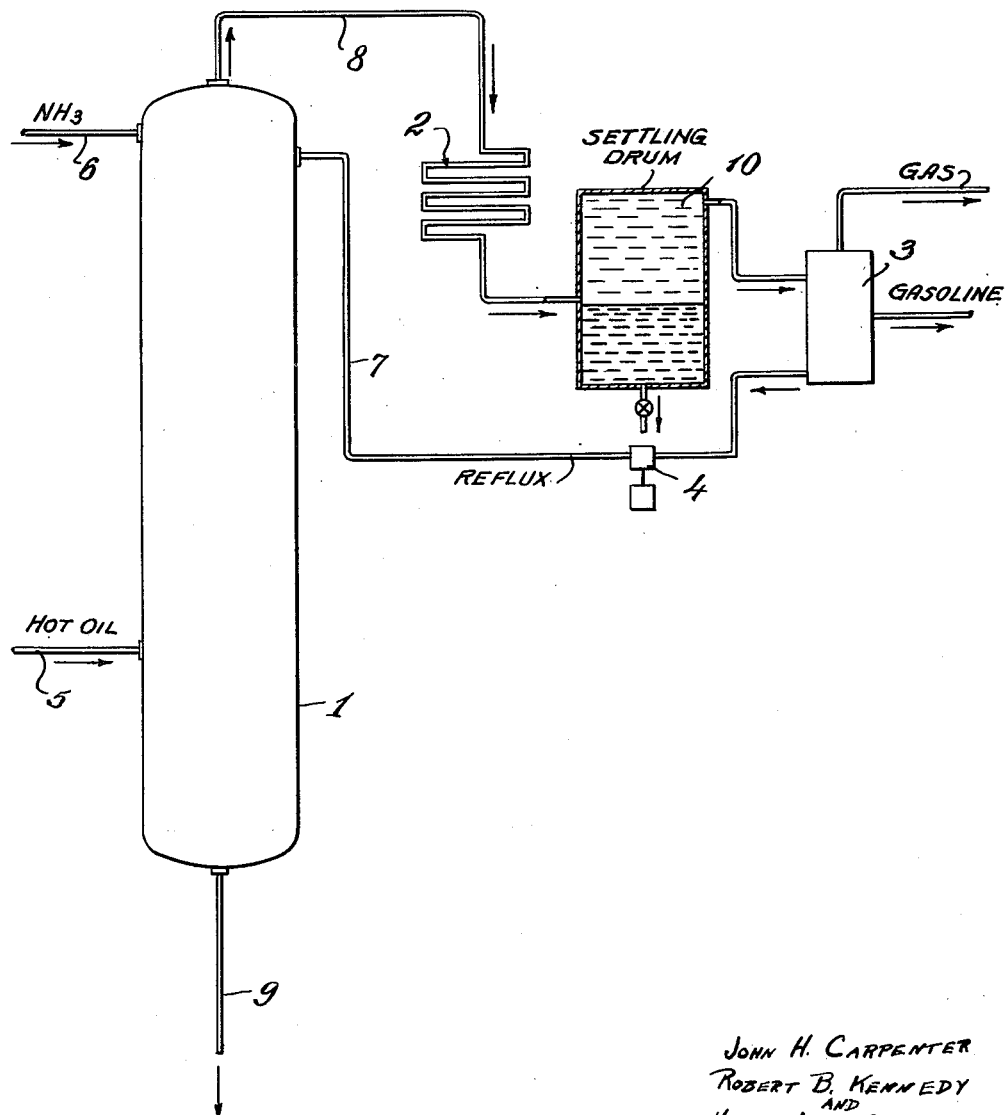
John H. Carpenter
Robert B. Kennedy
and
Harry J. McClanahan
INVENTORS
BY Oswald G. Hayes
ATTORNEY Patented Feb. 9, 1943

2,310,837

UNITED STATES PATENT OFFICE 2,310,837

PETROLEUM DISTILLATION

John H. Carpenter, Cambridge, Mass., and Robert B. Kennedy and Harry J. McClanahan, Beaumont, Tex., assignors to Socony-Vacuum Oil Company, Incorporated, New York, N. Y., a corporation of New York Application September 18, 1941, Serial No. 411,326

3 Claims. (Cl. 196—35)

This invention is directed to a method of operating a fractional distillation tower and relates particularly to operation of such towers in processes wherein ammonia is injected into the tower to protect the same against effects of corrosive compounds in an oil being distilled.

While the invention contemplates improvement of operations of the general type noted above, the present discussion is directed to a single specific embodiment for purposes of clarity. In topping a crude petroleum to remove the gasoline fractions therefrom, ammonia is passed into a fractionating column or bubble tower in which the distillation takes place to combat corrosion of the tower walls, trays, condenser lines and the like by sulphur compounds and other materials having a tendency to attack metals. Ammonium salts, notably ammonium chloride, are formed by reaction of the ammonia with various anions present in the crude and the salts so formed tend to deposit on the top trays and bubble caps of the tower, clogging the same to such an extent that it must be removed from operation and cleaned at frequent intervals.

This invention provides a method for avoiding deposition of salts and the like in and on the fractionating equipment by settling and decanting aqueous material from the overhead after condensation and subsequently passing the relatively water free condensate to a separation zone from which reflux for the tower is drawn.

The nature of the invention will appear from a consideration of the annexed drawing which shows, diagrammatically, a distillation set-up in accordance with the invention. The apparatus assembly is largely conventional in that it comprises a tower 1, condenser 2, separator 3 and reflux pump 4 connected in circuit by suitable piping. Hot crude oil is supplied to the tower by a transfer line 5 from any suitable heating means (not shown), such as a tube still. The oil partially vaporizes in the tower by reason of its contained heat and heat supplied by stripping steam passed to the tower either together with the hot oil in transfer line 5 or in any other suitable manner as well known in the art. Gaseous ammonia to combat corrosion is supplied at any desired point, such as ammonia line 6.

Fractions of the crude charge boiling below the end point of gasoline are withdrawn overhead through vapor line 8, while the heavier material passes out through line 9 in the liquid state.

The overhead is passed through condenser 2 wherein the normally liquid portion thereof is condensed, and is then separated into fixed gas and a liquid fraction, a portion of the latter being recycled through pump 4 to the top of tower 1 as reflux. It has been noted that this conventional operation results in excessive deposition of salts such as ammonium chloride on the top trays, say the top three or four trays, in tower 1. It has now been found that this difficulty may be overcome by the inclusion of a settling drum 10 in the circuit immediately after the gasoline condenser. By this means, an aqueous solution of the salts having a tendency to clog the bubble caps is separated from the distillate prior to the zone from which reflux is drawn. The overhead vapors in line 8 contain appreciable quantities of water vapor derived from the stripping steam passed to the tower 1 and the water condensed therefrom in condenser 2 dissolves the salts present in the vapors and that aqueous solution is removed from the system by withdrawal from settling drum 10, thus preventing these salts from being returned to the tower 1 with the reflux.

The settling drum 10 should be of large size in order to permit the condensate to become relatively quiet and thereby allow the aqueous material to settle out as completely as possible bearing in mind the desirability of continuous operation.

We claim:

1. In a method of fractionally distilling wherein a petroleum oil is fractionally distilled in the presence of steam and ammonia in a distillation zone to obtain overhead and bottoms, the overhead is condensed in a condensing zone, fixed gas separated therefrom in a separating zone and a portion of the condensate returned to said distillation zone as reflux for the distilling operation; the improvement which comprises passing condensate from said condensing zone to an enlarged settling zone wherein said condensate is held in a relatively quiescent state, removing aqueous matter settled from said condensate in said settling zone and thereafter passing said condensate to said separating zone.

2. In a method which comprises fractionally distilling a petroleum crude wherein said crude is passed in a heated condition to a bubble tower, steam is also supplied to said tower to aid in fractionation; ammonia is supplied to the upper portion of the tower to combat corrosion, a bottoms fraction and an overhead fraction are withdrawn from the tower, the overhead is condensed, fixed gases are separated from the condensate in a gas separating zone and liquid is drawn from the said gas separating zone and supplied to the upper portion of the tower as reflux; the improvement which comprises passing said condensate to a water separating zone, maintaining said condensate in a relatively quiescent state in said water separating zone to thereby cause separation of substantially all suspended aqueous matter from hydrocarbons and passing hydrocarbons substantially free of aqueous matter from said water separating zone to said gas separating zone.

3. In a method of fractionation wherein a petroleum oil is fractionally distilled in the presence of steam and ammonia in a distillation zone to obtain overhead and bottoms, the overhead is condensed in a condensing zone, fixed gas separated therefrom in a separating zone and a portion of the condensate returned to said distillation zone as reflux for the distilling operation; the improvement which comprises passing condensate from said condensing zone to an enlarged settling zone wherein said condensate is held in a relatively quiescent state, removing aqueous matter settled from said condensate in said settling zone and thereafter returning a portion of said condensate substantially free of aqueous matter to said distillation zone.

JOHN H. CARPENTER.
ROBERT B. KENNEDY.
HARRY J. McCLANAHAN.